United States Patent

Marino

[54] METHOD OF REPAIRING CRACKS IN ROADWAYS

[75] Inventor: Robert S. Marino, Peabody, Mass.

[73] Assignee: Mulch Seal, LLC, Peabody, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 09/061,445

[22] Filed: Apr. 15, 1998

[51] Int. Cl.⁷ ...................................................... E01C 7/35
[52] U.S. Cl. ................................................. 404/75; 404/82
[58] Field of Search .............................. 404/72, 74, 75, 404/78, 82, 107

[56] References Cited

U.S. PATENT DOCUMENTS

| | | | |
|---|---|---|---|
| 4,630,929 | 12/1986 | Medlin . | |
| 4,678,363 | 7/1987 | Sterner | 404/75 |
| 4,765,772 | 8/1988 | Benedetti et al. | 404/77 |
| 5,183,353 | 2/1993 | Buckelew | 404/75 X |
| 5,232,306 | 8/1993 | Sterner | 404/101 |
| 5,354,145 | 10/1994 | Sterner | 404/75 |
| 5,405,213 | 4/1995 | O'Connor | 404/77 |
| 5,439,313 | 8/1995 | Blaha et al. | 404/75 |
| 5,630,677 | 5/1997 | Barroso | 404/75 |

FOREIGN PATENT DOCUMENTS

| | | | |
|---|---|---|---|
| 95440 | 9/1970 | France . | |
| 95440 | 11/1970 | France | 404/75 |

[11] Patent Number: 6,074,128
[45] Date of Patent: ***Jun. 13, 2000

*Primary Examiner*—James A. Lisehora
*Attorney, Agent, or Firm*—Cesari and McKenna, LLP

[57] ABSTRACT

A method of repairing cracks and apertures in a roadway, including the step of filling the crack or aperture with petroleum emulsion and overlapping the crack or aperture with the emulsion to preferably up to one inch or greater beyond the edge of the aperture on each side; applying a layer of an organic, cover blotter material and mounding said cover blotter material to cover substantially the entirety of said petroleum emulsion layer. The emulsion penetrates and softens the pavement surrounding the site. When the emulsion cures, it coagulates with the cover blotter material. The roadway is reopened to allow traffic to pass over the site to further compact and smooth out the roadway repaired surface to eventually form a pliable smooth patch.

9 Claims, 1 Drawing Sheet

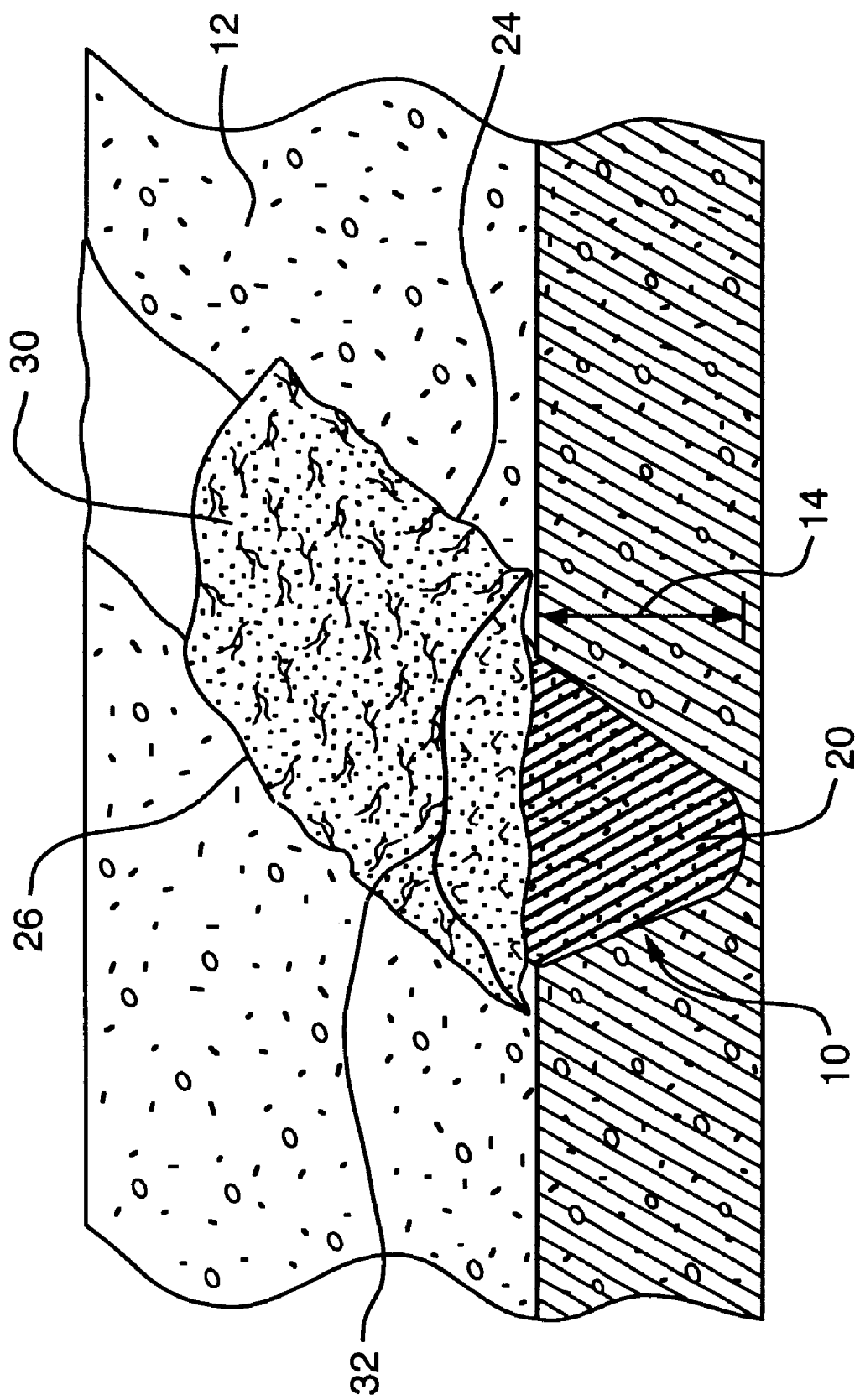

METHOD OF REPAIRING CRACKS IN ROADWAYS

FIELD OF THE INVENTION

This invention relates generally to a method of repairing cracks and small apertures in roadways, and more particularly, to a method of using divergent materials in repairing roadway cracks and imperfections. More particularly, the invention relates to use of an organic-based material with a petroleum emulsion.

BACKGROUND OF THE INVENTION

Cracks often develop in pavement roadways. Such roadways are constructed of different types of surfaces such as bituminous concrete, asphalt binders, asphalt emulsions and cement concrete. Cracks result from a variety of conditions such as, inter alia, poor quality base materials, lack of or inadequate compaction, surface movement, oxidation, overloading, and water penetration. Some cracks result from expansion and contraction due to weather conditions including climatic temperature changes. The widest and deepest cracks often appear at the longitudinal paving seams in bituminous concrete, typically caused by cold rolling. Some other types of cracks are intentionally made. For example, utility excavations involve cuts into roadways. These cracks are located at the perimeter of the excavation itself. Other small apertures, e.g., small potholes and pavement delaminations may also be fixed using crack repair methods. With scheduled crack repairs and maintenance, pavement surface life can be greatly extended, postponing the need for repaving the entire roadway surface.

Crack and aperture repairs may be needed urgently for safety reasons or where traffic conditions make lengthy road closures inconvenient or in some cases unacceptable. These repairs are ideally made as quickly, and as economically, as possible.

There are various methods of making repairs of such cracks. Hot crack "sealing" is the most common method in which the crack is first cleaned by a mechanical device or by the application of compressed air. The crack is then filled with a hot sealing substance and blotted with a cover material. The next step in the process is to allow the site to cure. This process is usually performed in temperatures well above freezing.

Preparation of the hot sealing substance requires various mixing steps at elevated temperatures and continued agitation of sealing materials which must be placed in heated oil in double-jacketed kettles. This process is costly due to the specialized equipment needed, and the substantial labor requirements involved. The asphalt-based and additive enhanced materials are also comparatively expensive.

More recently, cold processes have been developed which can be performed in colder temperature conditions and do not require the specialized equipment needed for hot crack sealing. However, problems have arisen with such processes especially in connection with dust clouds forming during the repair process. More specifically, known cold processes include filling the crack or aperture with a petroleum emulsion until voids no longer exist. The petroleum emulsion is then covered with a layer of a mineral filler. The mineral filler typically consists of sand, stone dust, stone-sand, limestone, rock "screenings", washed screenings and the like.

In this process, the repairer fills the site with petroleum emulsion and then applies the mineral filler on the surrounding surface as a coating layer. However, the mineral filler produces a great deal of airborne dust. A dust cloud can be formed by traffic in the lane and, it is then aggravated by the passage of traffic in other lanes. This can produce extremely low visibility conditions that may lead to road closure.

In addition to the dust problems, there are other problems associated with cold processes. More specifically, the mineral filler can be quite expensive. It is also rather heavy causing labor requirements to be substantial. Moreover, the accumulation of the mounded mineral filler combined with the petroleum emulsion can leave a ripple effect on the roadway surface, creating a rough surface for vehicular traffic.

One advantage to using the cold process relates to roadway rejuvenation. Specifically, roadways are constructed and repaired with the additional goal of longer road surface life. Sometimes a roadway can be later rejuvenated when repair material is subsequently spread out by tires of passing vehicles. The materials fill in hairline cracks which may be beginning to form in the roadway. This usually occurs, if at all, after the winter when temperatures begin to warm and a repaired crack site becomes somewhat tacky. The tires of passing vehicles pick up materials and spread them to other areas of the pavement. However, whether this occurs with known cold processes can be unpredictable.

There remains a need for a method of repairing cracks in roadways which does not produce dangerous airborne dust and does not result in large amounts of road closure time. There remains a further need for a process that is less costly in that it utilizes materials that are comparatively less costly than prior known materials and such materials, being lighter, involve fewer labor requirements than known prior methods. Another need exists for a process which results in a smooth surface with little ripple effect. There remains a further need for a method which increases the likelihood of roadway rejuvenation when materials are subsequently spread by passing vehicles.

SUMMARY OF THE INVENTION

These and other needs are satisfied by the method of the present invention which is a low cost, cold process of repairing roadways that utilizes recycled materials in a cover blotter step of the process. More specifically, the method of the present invention includes filling a suitable repair site with a petroleum emulsion until the emulsion fills up the site and overlaps the edges of the aperture to a predetermined amount. Thereafter, the method includes the step of applying a cover blotter consisting of an absorbent, highly porous, spreadable bulk material, including an organic, vegetatively-derived mulch as defined herein, alone or in combination with screened pavement sweepings that include organic material. Without being bound to any particular theory or mechanism, it is believed that the curing process is enhanced by the presence of the cover blotter which in part performs a blotting function by both adsorbing and absorbing the continuous phase of the emulsion.

After the cover blotter is applied, the site is re-opened to traffic. The passage of traffic over the repaired site will aid in the capture of cover blotter particles by the petroleum emulsion, and serves to smooth out the repair site. Thus, there is an advantage to early re-admission of traffic onto the roadway in contrast to repair sites which involve layers of loose gravel, sand or other mineral filler which cannot be left exposed on high speed roadways, due to the dust problem discussed herein.

As noted, with the cover blotter material of the present invention, dust is greatly reduced. Moreover, there is considerably more adherence of the cover blotter material, compared to the mineral filler into the petroleum emulsion. Thus, sever mounding does not occur in the repaired area, and the ripple effect encountered using other methods is greatly lessened. The inventive process results in a more smooth road surface.

Organic mulch is considerably lighter in weight than mineral fillers, therefore greater quantities of the material can be hand-placed at a given unit labor cost compared with known mineral filler. Further, the organic mulch is readily available as a product of recycling in large quantities at little or no cost. For example, some forms of organic mulch may be leaves collected by municipalities, such municipalities typically are readily willing to dispose of this type of material. Similarly, the pavement sweepings are readily available at the site at no cost. Additionally, loose mulch swept up with pavement sweepings from one repair site may be later recycled and used at a different repair site.

BRIEF DESCRIPTION OF THE DRAWING

The above and further advantages of the invention may be better understood by referring to the following description in conjunction with the accompanying drawing, in which the FIGURE depicts a roadway with a crack to be filled and sealed in accordance with the method of the present invention.

DETAILED DESCRIPTION OF THE PREFERRED EMBODIMENT

The FIGURE depicts a crack 10 in a bituminous concrete roadway 12. The crack 10 is about two to three inches in depth as designated by the dimension 14 in the FIGURE. The method of the present invention is preferably used with cracks, delaminations, and small type potholes of such a depth, in various types of bituminous pavements, or cement concrete pavements. However, the scope of the invention is not confined to repair sites of such a depth.

In accordance with the method of the present invention, the crack 10 in the pavement is filled with a petroleum emulsion 20. The term "petroleum emulsion" as used herein shall include petroleum emulsions, asphalt emulsions or modifications to such emulsion, including anionic, cationic and nonionic materials. A suitable petroleum emulsion is a product sold under the trademark "CRF" by Golden Bear Oils Specialties of Los Angeles, Calif. It is preferred that petroleum emulsions used in the process of the present invention have a viscosity range, as will be understood by those skilled in the art, on asphalt emulsions' residue by ASTM Standard D-244 of 10 to 3,000 poises at 60 degrees C. (Celsius). (With respect to the CRF product, conversion of cSt (Centistokes) viscosity of the CRF product at 60 degrees C. to poises is about 1 poise=100 cSt.). It is also preferred that the petroleum emulsion used in the process of the invention have a residual value of between about 55 and 75 percent (by weight).

The crack 20 is filled with the petroleum emulsion until it substantially overlaps the petroleum emulsion onto the pavement surface of the roadway 12 on each side of the aperture. For example, but without being bound by the example, the overlap may measure approximately one inch to six inches or further, as desired in a particular application. The overlapping portions are illustrated in the figure with reference characters 24 and 26.

After the petroleum emulsion 20 has been filled and overlaps the crack 10 in the roadway, the repairer will then cover the crack with a mounded layer of a cover blotter material 30. The term "cover blotter" material as used herein shall include any mulch material which is an organic, vegetatively-derived substance, such as mulched leaves, a combined mulch formed of leaves, grass trimmings and garden trimmings, tree bark mulch, tree mulch, mulched wood, hay or sawdust, and the like. Such materials are available commercially as well as from certain municipal refuse or waste management facilities as recyclables. The cover blotter material preferably includes aged mulch which can provide heat to the curing process although this is not required. In addition, the term "cover blotter" as used herein also includes pavement sweepings including leaves and so forth that drift to the curbside. Further, a combination of loose mulch and pavement sweepings swept up from one repair site can be recycled and used for a subsequent repair project. Preferably, the mulched material and the pavement sweepings are screened or graded to obtain particulates of a desired size.

The cover blotter material 30 is applied such that it is mounded over and covers substantially all of the petroleum emulsion 20, as designated by the dashed lines 32 in the FIGURE. The cover blotter material performs a blotting function by exhibiting a wicking action in that it is capable of both adsorbing and absorbing the continuous phase of the emulsion. After mounding the cover blotter material over the petroleum emulsion, preferably the tires of a truck or other large vehicle are driven over the site to compress the cover blotter into the emulsion. Thereafter, the site is checked for substantial total liquid blotting. If any liquid remains visible, additional cover blotter material is added until no further liquid remains. The cover blotter material enhances the curing process as a portion of the cover blotter material 30 is "grabbed" by the petroleum emulsion and coagulates into the emulsion, forming a cover on the surface of the roadway 12.

In certain circumstances, various mineral fillers as described herein may be combined with the cover blotter material in a desired proportion to increase consistency of the cover blotter. This thickens the cover blotter material, and provides greater stability in the case of deeper or wider cracks.

After the petroleum emulsion and cover blotter material have been applied, the site is then immediately reopened to traffic. This is possible as there is very little airborne dust created by the cover blotter. As the traffic passes over the site, the rubber tires serve to continuously work the petroleum emulsion into the softened roadway. Without being bound to any particular theory or mechanism, it is believed that the cover blotter material is grabbed into the petroleum emulsion, and as the water in the emulsion evaporates, the cover blotter fills any interstices left in the emulsion so that there are minimal air voids in the repaired site. Thus, there is an advantage to early re-admission of traffic to the roadway.

The cover blotter material of the present invention remains partially suspended in the emulsion such that, upon softening of the repaired site after the winter cycle, there is increased adhesion of material to passing tires. This serves to spread the material about the nearby roadway, serving to rejuvenate the roadway by re-sealing hairline cracks and the like. This tends to increase density leading to longer road surface life.

To further enhance the disclosure and to illustrate the method of the present invention, an example will be considered. It should be understood however, that the example illustrates one embodiment of the invention and the invention is not limited to the scope of the example.

EXAMPLE

In accordance with the method of the present invention, a repairer examines a crack, delamination or small-type pothole in the pavement to determine whether it is the appropriate size for the method of the present invention. Once this determination has been made, there is no need to clean the site or otherwise prepare the site for the sealing process. The repairer applies a petroleum emulsion to the site opening. The petroleum emulsion used in the example is the CRF product having the specifications outlined herein. Petroleum emulsion is filled into the crack and overlaps the crack by about 1 inch beyond the edge of the aperture. A cover blotter material consisting of organic mulch mixed with a portion of screened pavement sweepings is then placed over all the exposed petroleum emulsion areas. The cover blotter material, defined herein, is mounded to blot any excess liquid. A dump truck is then driven over the repair site. The flexible tires serve to smooth out the site more evenly than conventional rollers. Seams and ridges, which can be left by a roller, are not produced. The site is then re-opened to traffic, and as the traffic passes, the rubber tires will further serve to work the surface and smooth out the repaired site to level it with the roadway and the ripple effect is greatly decreased.

The method of repairing cracks in roadways described herein is an economical method in that it uses recycled materials which are, in certain circumstances, available free of charge from municipal refuse facilities. If, on the other hand, the material is purchased commercially, it is typically significantly less costly than the conventional mineral filler material. Furthermore, the cover blotter disclosed herein produces much less dust during the application process than is produced during known prior methods. This process thus leads to fewer, and shorter road closures. Additionally, the process involves a lighter weight material which is more easily spread. Accordingly, labor costs are greatly reduced.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method of repairing openings, including cracks, apertures and small potholes in a site in a roadway including the steps of:

(A) supplying the site with a first material to fill the opening defined by said site and to soften the portion of the roadway adjacent the opening, said first material being comprised substantially of petroleum emulsion;
   (B) selecting as a second material an absorbent, highly porous, spreadable bulk material, from the group of organic, vegetatively-derived substances consisting of mulched leaves, mulched fruit, grass trimmings and garden trimmings, tree bark mulch, tree mulch, mulched wood, hay, sawdust;
   (C) following the supplying step, applying said second material as a cover blotter material to the site covering substantially the entirety of the first material such that said cover blotter performs a blotting function in that it both adsorbs and absorbs a continuous phase of said first material forming a suspended mass in said first material; and
   (D) compressing said second material into said first material until said second material permanently coagulates into said first material to produce a repaired road surface.

2. The method of claim 1 further including the step of re-opening the site to traffic to allow the traffic to continuously work said first material and said second material into the site.

3. The method of claim 1 further including the step of adding a mineral filler material to said second material.

4. The method of claim 1 including the further step of screening said second material prior to mounding said second material over said first material.

5. The method of claim 1 including filling the site with said first material in such an amount that it overlaps a perimeter of the site.

6. The method of claim 1 including compressing said second material into said first material by driving a vehicle's tires over said repaired surface.

7. The method of claim 1 including selecting a petroleum emulsion from the group consisting of petroleum emulsions, asphalt emulsions, modifications thereof, anionic, cationic and nonionic emulsions.

8. The method of claim 1 including selecting a petroleum emulsion having a viscosity range on asphalt emulsions' residue by ASTM Standard D-244 of about 10 to 3,000 poises at 60 degrees C.

9. The method of claim 1 including selecting a petroleum emulsion having a residual value of between about 55 and 75 percent.

* * * * *